United States Patent
Davey et al.

(10) Patent No.: US 9,948,076 B1
(45) Date of Patent: Apr. 17, 2018

(54) RACK PULLEY SYSTEM

(75) Inventors: Andrew Lee Davey, Overland Park, KS (US); David Wayne Haney, Kansas City, MO (US); Christopher Joseph Mateski, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1250 days.

(21) Appl. No.: 11/866,519

(22) Filed: Oct. 3, 2007

(51) Int. Cl.
*H02G 1/04* (2006.01)
*B65H 57/14* (2006.01)

(52) U.S. Cl.
CPC .............. *H02G 1/04* (2013.01); *B65H 57/14* (2013.01)

(58) Field of Classification Search
CPC .................................. H02G 1/04; B65H 57/14
USPC ................. 254/390, 393–395, 405, 413, 414
See application file for complete search history.

(56) References Cited

U.S. PATENT DOCUMENTS

| | | | | | |
|---|---|---|---|---|---|
| 522,524 | A | * | 7/1894 | Hook | 114/101 |
| 548,915 | A | * | 10/1895 | Hartz | 254/401 |
| 801,367 | A | * | 10/1905 | Davidson | 254/394 |
| 1,525,837 | A | * | 2/1925 | Walker et al. | 242/157 R |
| 2,142,309 | A | * | 1/1939 | Ealy | 254/394 |
| 2,188,715 | A | * | 1/1940 | Ingram | 254/134.3 PA |
| 2,293,902 | A | * | 8/1942 | Johns | 248/67.7 |
| 2,422,353 | A | * | 6/1947 | Hitt | 242/157 R |
| 2,783,025 | A | * | 2/1957 | Scheidt | 254/396 |
| 2,816,734 | A | * | 12/1957 | Crofoot | 242/615.2 |
| 2,946,559 | A | * | 7/1960 | Pickett | 254/134.3 PA |
| 3,095,471 | A | * | 6/1963 | Price | 174/160 |
| 3,098,638 | A | * | 7/1963 | Mcauley | 254/134.3 PA |
| 3,261,278 | A | * | 7/1966 | Jiruska | 134/112 |
| 3,372,908 | A | * | 3/1968 | McCarthy | 254/405 |
| 3,545,724 | A | * | 12/1970 | Wright | 254/134.3 PA |
| 3,565,401 | A | * | 2/1971 | Green | H01R 39/64 |
| | | | | | 174/5 SG |
| 3,834,674 | A | * | 9/1974 | Jackson | 254/394 |
| 3,853,304 | A | * | 12/1974 | Jackson | 254/394 |
| 4,019,715 | A | * | 4/1977 | Vugrek | 254/134.3 R |
| 4,079,916 | A | * | 3/1978 | Einhorn et al. | 254/390 |
| 4,423,853 | A | * | 1/1984 | Davis, Sr. | 254/390 |
| 4,475,715 | A | * | 10/1984 | Asplin, Sr. | 254/134.3 R |

(Continued)

OTHER PUBLICATIONS

Masloski, Rick; Russell, David & Dorn, David, "The Evolution of Fiber Management Within Central Offices," IEEE, 1990, pp. 0527-0532.

(Continued)

*Primary Examiner* — Michael E Gallion

(57) ABSTRACT

A removable rack pulley system is provided. The removable rack pulley system is detachably connected to a rack and is employed to adjust cables that are associated with equipment stored in shelves of the rack. The rack pulley system includes a cable-run assembly and a locking mechanism. The locking mechanism includes a pressure-actuated locking pin to adhere and release calipers that attach the rack pulley system to the rack. The cable-run assembly uses a multi-length shaft that is integrally connected to the locking mechanism. The multi-length shaft is configured to receive multiple spools of cable to allow various types and sizes of cables to be simultaneously pulled through the rack pulley system while retaining separation of the cables during adjustment of cables. The spools are secured in the cable-run assembly by a holding wire that detachably connects to an end of the multi-length shaft.

17 Claims, 4 Drawing Sheets

(56) References Cited

U.S. PATENT DOCUMENTS

| | | | | |
|---|---|---|---|---|
| 4,479,453 | A | * | 10/1984 | Bonassi .................. 114/218 |
| 4,549,723 | A | * | 10/1985 | Castilano ................ 254/405 |
| 4,869,344 | A | * | 9/1989 | Peterson ................ 182/129 |
| 5,149,059 | A | * | 9/1992 | Monahan ................ 254/394 |
| 5,573,226 | A | * | 11/1996 | Smith .................... 254/395 |
| 5,690,301 | A | * | 11/1997 | Shelton et al. ........... 242/597.8 |
| 5,732,899 | A | * | 3/1998 | Wells .................... 242/423.1 |
| 6,155,441 | A | | 12/2000 | Anderson et al. |
| 6,189,867 | B1 | * | 2/2001 | O'Rourke et al. ........... 254/391 |
| 6,315,269 | B1 | * | 11/2001 | Fleury et al. ........ 254/134.3 PA |
| 6,729,606 | B1 | * | 5/2004 | Durin .................... 254/395 |
| 7,007,929 | B2 | * | 3/2006 | Kwon .................... 254/395 |

OTHER PUBLICATIONS

Chatsworth Products, Inc, "Cable Management at the Cross-Connect: Standards-Based Practices Using Chatsworth Products Open Freestanding Racks," 2004, 18 pp.

Chatsworth Products, Inc., "Rack Systems," http://www.chatsworth.com/main.asp?id-25, 4 pp.

Chatsworth Products, Inc., "Cable Management," http://www.chatsworth.com/main.asp?id-29, 3 pp.

Chatsworth Products, Inc., "Cable Runway & Tray Products," http://www.chatsworth.com/main.asp?id-230, 2 pp.

Chatsworth Products, Inc., "FastTrac™ Cable Tray," http://www.chatsworth.com/main.asp?id-245, 4 pp.

Goolsbee, Chuck ; Digital Forest, "Ethernet Wiring and Second Fiber Connection," Jan. 1, 2005, http://www.forest.net/support/archives/2005/01/000494.php, 3 pp.

Barry Controls, "Vlier-LOCK Ball Locking Pins," http://www.vlier.com, 2006, 2 pp.

Innovative Components, Inc., "Wire Lock Pins," http://knobsource.thomasnet.com/viewitems/all-categories-pins-quick-release-pins/wirelock-pins?&plpver=1002&forward=1, 2 pp.

Chatsworth Products, Inc., "FastTrac™Installation Tools for CPI FastTrac Cable Tray," Product Data Sheet, 2004, http://www.chatsworth.com, 2 pp.

* cited by examiner

RACK PULLEY SYSTEM

Cable technicians install cables in a data center with conventional cabling systems, such as, for example, manual systems and rack-specific pulley systems. The manual systems require cable technicians to position and guide the new cables over existing cables present in a rack. A manual system requires multiple cable technicians to assist when laying down cabling in the data center. Some cable technicians use a ladder to achieve the appropriate elevation when pulling the cables. Other cable technicians guide the cables from a first location, at an elevation below the elevated cable technicians, to a second location at the elevation of the cable technicians using the ladder. A manual system is cost intensive because of, among other things, the number of cable technicians that are required to install cables in the data center.

The rack-specific pulley systems are built into a rack at specific locations and allow the cable technicians to pull cables along the rack. The rack-specific pulley systems reduce the number of cable technicians that are required to install cabling in the data center. However, the rack-specific pulley systems have some shortcomings. For instance, the rack-specific pulley systems are not completely removable and are burdensome to install when configuring a rack. Once a rack-specific pulley system is installed it may not be removed without disassembling the rack. Additionally, the rack-specific pulley systems are not reusable with racks manufactured by other vendors and only allow a single type of cable to be pulled along the overhead rack at a time. Because of the noted shortcomings, and other problems associated with the manual systems and rack-specific pulley systems a need exists for pulley systems that reduce cabling costs and allow cable technicians to efficiently install cables.

SUMMARY

The present invention is defined by the claims below. Embodiments of the present invention solve at least the above shortcomings and problems by providing a removable rack pulley system. The present invention has several practical applications in the technical arts including reducing the number of cable technicians required to install multiple types of cables, providing an adaptable, removable pulley system that may be used with different types of racks, and providing a simple locking and releasing mechanism to reduce the complexity associated with configuring a rack and installing a pulley system.

In a first aspect, a removable pulley system attachable to a rack is configured with a cable-run assembly, a locking mechanism, and an arm connecting the cable-run assembly and the locking mechanism. The cable-run assembly includes a plurality of cables and a holding wire to secure the plurality of cables in the cable-run assembly. The locking mechanism includes holes to receive a locking pin that secures the removable pulley system to the rack. The arm integrally attaches the cable-run assembly and locking mechanism of the removable pulley system and forms a continuous L-joint of the removable pulley system.

In a second aspect, an apparatus for running cables along a rack by employing a removable pulley system includes an attachment mechanism, a shaft, and an U-shaped holding wire. The attachment mechanism secures the apparatus to the rack and is perpendicular to the rack. The shaft is connected to the attachment mechanism and receives spools of cable that are pulled by a cable technician. The U-shaped holding wire secures the spools of cable to the shaft. The U-shaped wire may be permanently attached to a joint where the attachment mechanism and the shaft intersect. Further, the U-shaped wire latches to the shaft by a snapper pin at an end of the shaft opposite to the joint connecting the attachment mechanism and the shaft.

In a third aspect, an apparatus for locking a removable pulley system to a rack includes a cable-run assembly, a n-shaped member, and a locking pin. The cable-run assembly is configured to release or retract cable along the rack. The n-shaped member includes holes and integrally attaches to a common joint between the cable-run assembly and the n-shaped member. The locking pin traverses the holes of the n-shaped member to secure the pulley system to the rack.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide a removable pulley system that is configured to attach to a rack. The removable pulley system enables a cable technician to simultaneously run multiple types of cables. Additionally, the removable pulley system enables the cable technician to simultaneously run the multiple types of cables and to stop a single cable along the cabling path without interfering the other cables. Moreover, the removable pulley system includes a simple locking and releasing system that allows attachment and removal from the rack.

In an embodiment, the removable pulley system allows is attachable to a overhead rack and allows a cable technician to simultaneously run multiple cables. For example, the cables may include, but are not limited to, power cables, networking cables, telephone cables, and other device cables. The removable pulley system may include a cable assembly and a locking mechanism. The removable pulley system may be manufactured with steel, iron, or other suitable materials. The components of the removable pulley system may be made from moldings or by welding or connecting the various components together.

Figure 1:
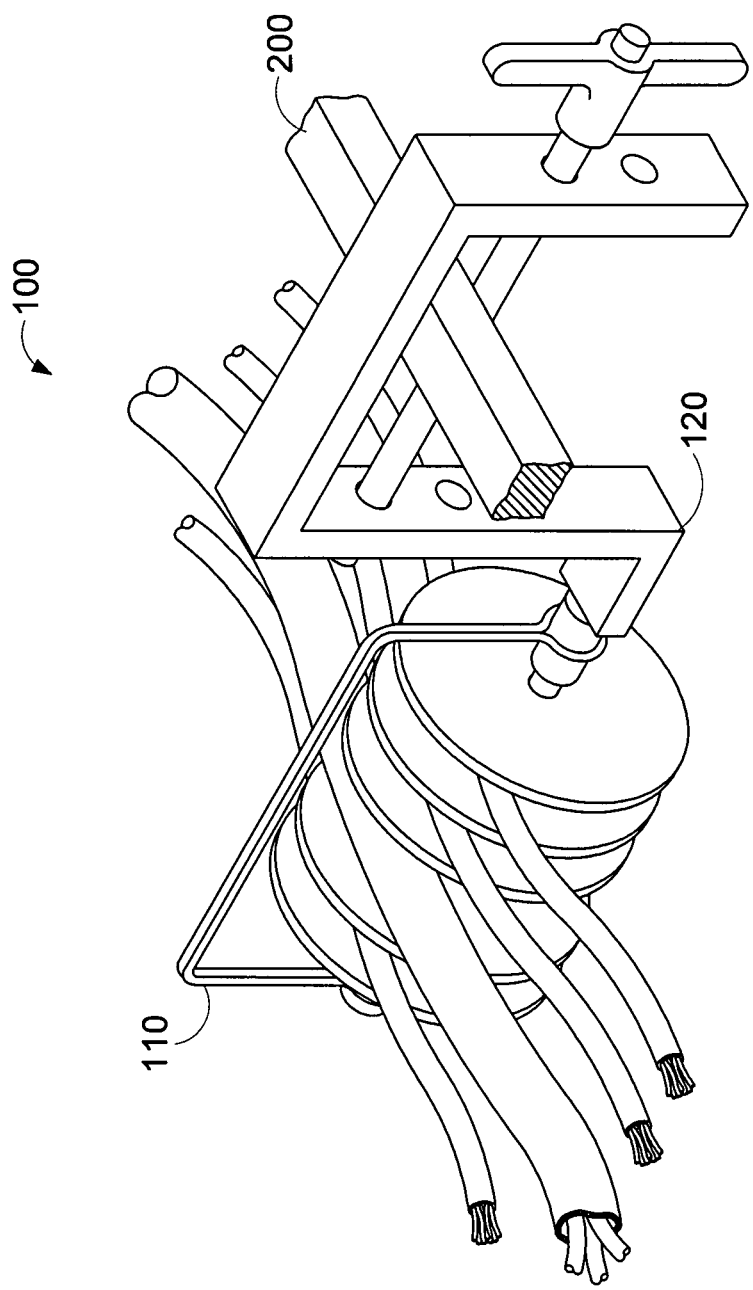
FIG. 1 is a perspective diagram of an exemplary removable pulley system, according to embodiments of the present invention.

FIG. 1 is a perspective diagram of an exemplary removable pulley system 100, according to embodiments of the present invention. The removable pulley system 100 includes a cable-run assembly 110 and a locking mechanism 120. The removable pulley system 100 is attachable to the rack 200.

The cable-run assembly 110 is integrally attached to the locking mechanism 120 by an L-joint of the removable pulley system 100. The cable-run assembly 110 allows cables of various types to run along a path provided by the rack 200. The cable-run assembly 110 is configured with spools of cables that are capable of rotational movement when a cable technician runs the cables along the path.

The locking mechanism 120 attaches to the rack 200. In an embodiment, the locking mechanism attaches to the rack 200 via pressurized release clips that automatically secure the removable pulley system 100. The pressurized release clips may include calipers that automatically engage the rack 200. Alternatively, the locking mechanism 120 may include a n-shaped member having apertures to receive a locking pin. The locking pin is pushed through a hole on either side of the n-shaped member of the locking mechanism 120 to secure the removable pulley system 100 to the rack 200.

The rack 200 may be a shelving system that carries various types of data equipment. The rack 200 may be a overhead rack that provides a overhead path for cables associated with the data equipment located in the shelves. The removable pulley system 100 may attach to different segments of the rack 200.

A skilled artisan appreciates and understands that the exemplary rack pulley system 100 has been simplified and that alternate arrangements fall within the scope and spirit of the above description.

In an embodiment, the removable pulley system automatically attaches to a rack. The locking mechanism may include a manual lock or automatic lock. The removable pulley system is disengaged from the rack by the cable technician after the cable technician completes installation of the cables.

Figure 2:
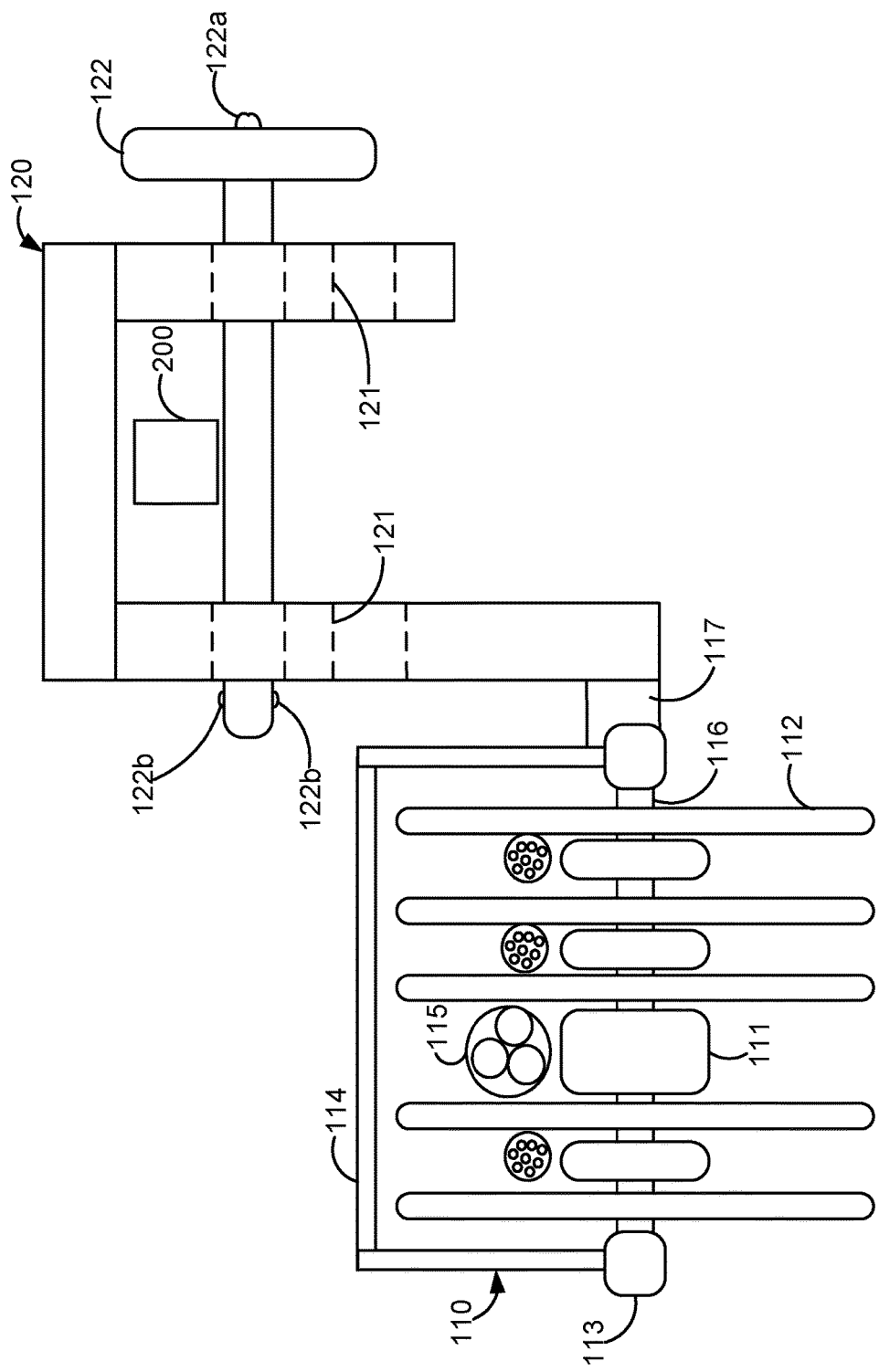
FIG. 2 is a front view diagram of the exemplary removable pulley system of FIG. 1, according to embodiments of the present invention.

FIG. 2 is a front view diagram of the exemplary removable pulley system 100 of FIG. 1, according to embodiments of the present invention. In FIG. 2, additional components of the cable-run assembly 110 and locking mechanism 120 are illustrated.

The cable-run assembly 110 may include guides 111, spacers 112, a snapper pin 113, holding wire 114, cables 115, a shaft 116, and an arm 117. The cable-run assembly 110 includes a shaft 116 which can be one of several lengths to accommodate a plurality of cables 115 laid side by side on the guides 111 and separated by spacers 112. A holding wire 114 secures the spacers 112 and cables 115 to the shaft 116.

The guides 111 are components that are specially-coated and shaped to reduce the amount of force required to pull the cable 115. The guides 111 are sized differently based on the size of the cables 115 that a cable technician is installing. The guides 111 may be made from polyvinyl chloride (PVC) and allow the cables 115 to travel across the guides 111 with minimal friction. The diameter of the guides 111 may match the diameter of the cable 115. The guides 111 are used to reduce the amount of friction that is generated when the cable technician is installing the cables 115. In some embodiments, the guides 111 are located along the shaft 116 and are a cylindrical-shaped component that is placed on the shaft 116 to direct the cables 115. For each cable 115 the cable technician installs, a separate guide 111 is employed to direct the cables 115.

The spacers 112 are disc-shaped separators that prevent the cables 115 from tangling when the cable technician is pulling the cables 115 along the rack 200. In one embodiment, the spacers 112 are PVC discs of appropriate sizes. Generally, the spacers 112 are significantly larger than the guides 111. In certain embodiments, the spacers 112 are inserted between cables 115 when a subset of the cables 115 are not pulled the entire length of the rack 200. Thus, the spacers 112 are used for spacing between cables 115 to allow the cable technician to simultaneously run multiple cables 115 and to stop running any subset of cables 115, while the cables 115 outside of the stopped subset of cables 115 are continuously pulled by the cable technician. For example, running one cable 115 seven feet and others cables 115 seventy feet may be accomplished with the use of the spacers 112. Further, the spacers 112 are placed to separate different types of cable 115 to ensure separation in the overhead rack by the cable technician. For instance, in the removable pulley system 100 spacers 112 are used to separate power cables (220V) from data cables (category 5).

The snapper pin 113 secures the guides 111, spacers 112, and cables 115 to the shaft 116. The snapper pin 113 is located at the end of the shaft 116 opposite the L-joint connecting the cable-run assembly 110 and the locking mechanism 120. The snapper pin 113 receives a portion of the holding wire 114 to latch the holding wire to the shaft 116.

The holding wire 114 is attached to the L-joint connecting the cable-run assembly 110 and the locking mechanism 120 and forms a U-shaped wire that is latched to the shaft 116 by the snapper pin 113. The holding wire 114 allows the guides 111, spacers 112, and cables 115 on the shaft 116 to operate as a collection of spools that adjust the cables 115 along the rack 200.

The cables 115 include power cables, network cables, telephone cables, device cables, or any other cables that may be used by a cable technician that install cables in a data center or other facility.

The shaft 116 receives the guides 111 and spacers 112. The shaft 116 allows the guides 111 and spacers 112 to rotate when the cable technician pulls the cables 115. The shaft 116 does not rotate because the guides 111 provide a rotational force that reduces the friction on the cables 115. In an embodiment, the shaft 116 is a removable component of the cable-run assembly 110. The shaft 116 may be sized at various lengths. When a longer shaft is required to maintain larger cables or a larger number of guides 111 and spacers 112, the cable technician may remove a shorter shaft 116 for a longer shaft 116. In another embodiment, the shaft 116 is adjustable and permanently attached to the L-shaped joint connecting the cable-run assembly 110 to the locking mechanism 120. Thus, the adjustable shaft 116 may be lengthened by the cable technician without removing the shaft 116.

In an embodiment, the locking mechanism 120 includes holes 121 and a locking pin 122. The locking mechanism 120 may include a n-shaped bar having holes that mate with the locking pin 122. The locking pin 122 is pushed through a hole 121 on either side of the n-shaped member. The locking pin 122 locks the removable pulley system 100 to the rack 200.

The locking pin 122 includes a button 122a and retractable balls 122b. When the button 122a is depressed, the retractable balls 122b retract. When locking pin 122 has traversed the holes 121 of the n-shaped member and the button 122a is not depressed, the removable pulley system 100 is locked. When the button 122a is depressed and the locking pin 122 is removed from the holes 121, the removable pulley system 100 is not locked. By depressing and retracting the retractable balls 122b, the locking pin 122 may be removed and the removable pulley system 100 may be detached from the rack 200 and reused by the cable technician. In some embodiments, the locking mechanism 120 may include a n-shaped member having holes 121 at the ends of parallel portions of the n-shaped member. The holes 121 are sized to receive the locking pin 122 to secure the removable pulley system 100 to the rack 200.

Figure 3:
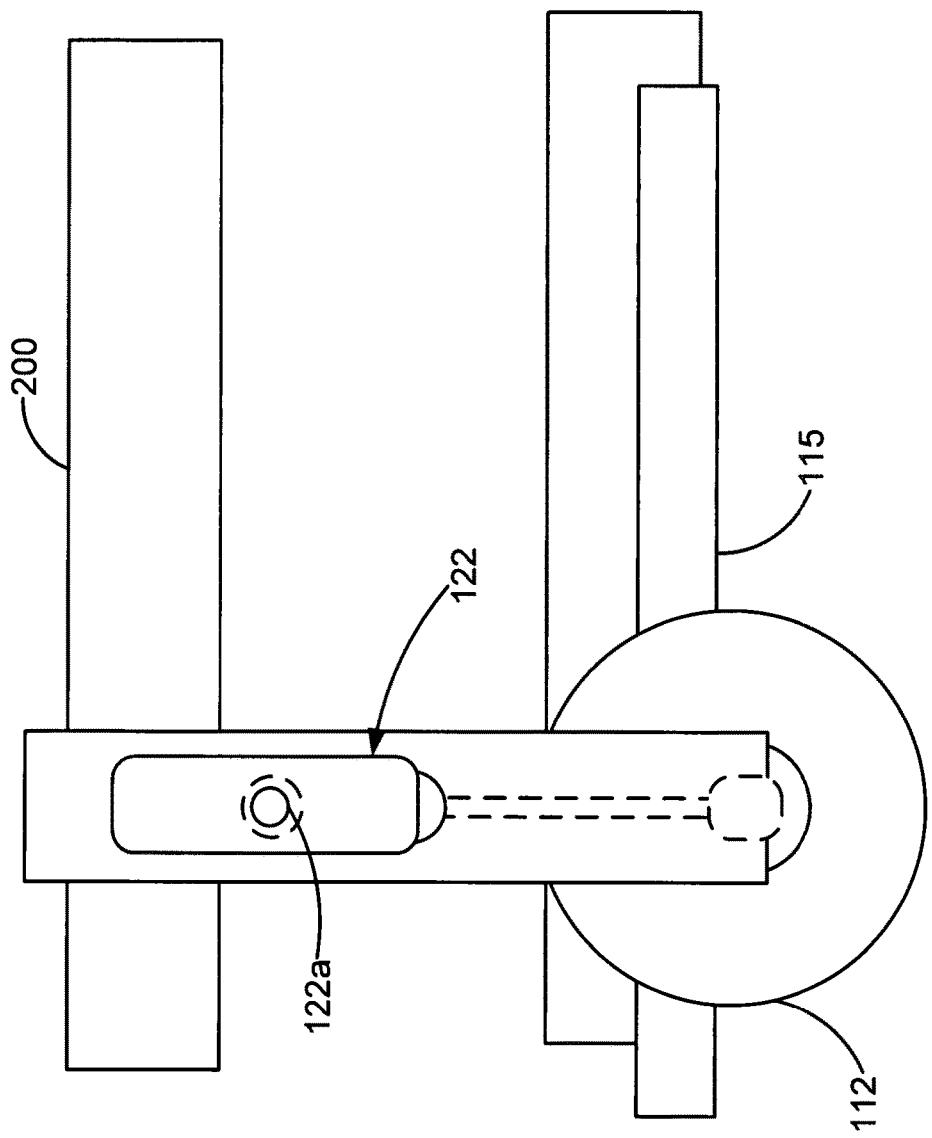
FIG. 3 is a side view diagram of the exemplary removable pulley system of FIG. 1, according to embodiments of the present invention.
Figure 4:
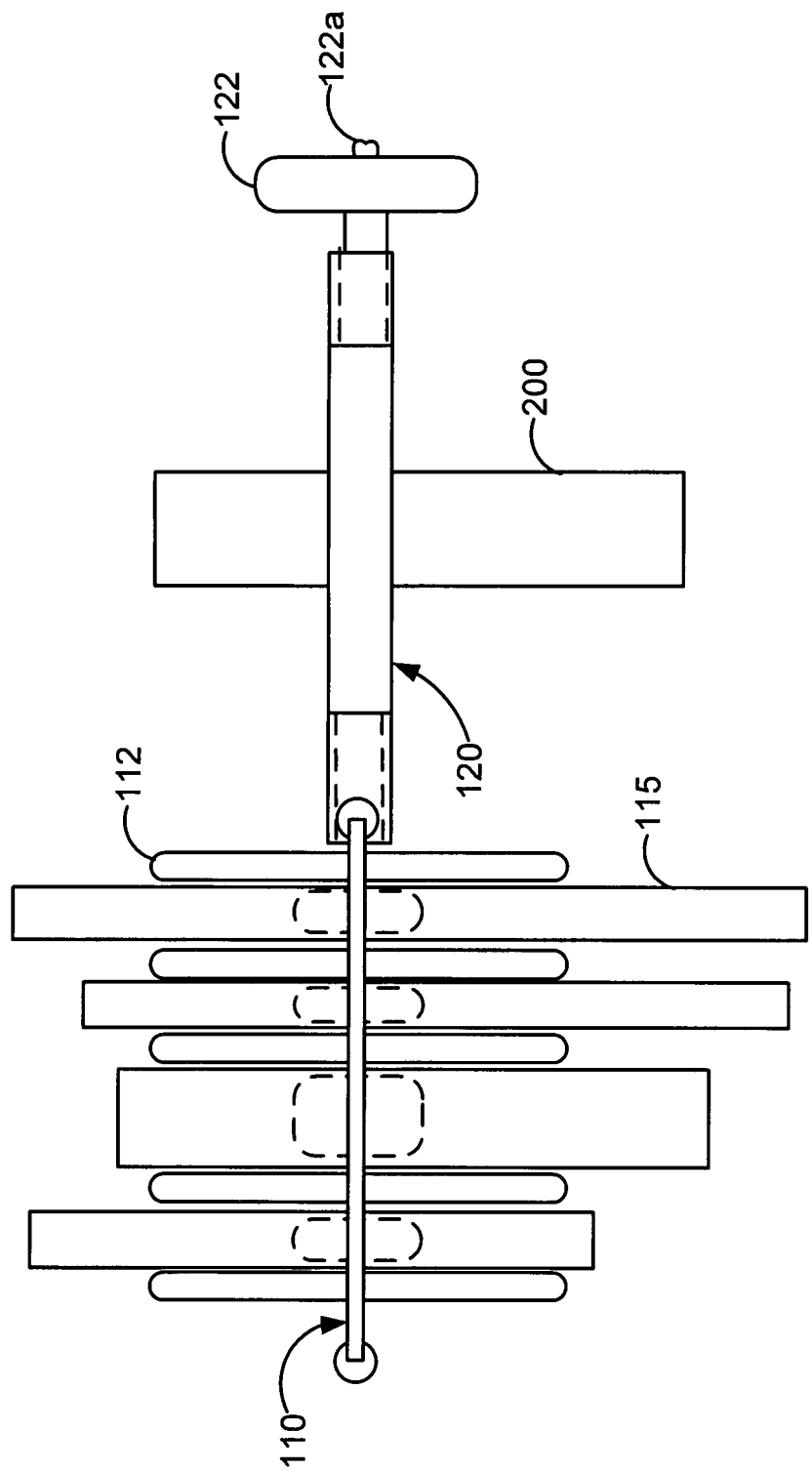
FIG. 4 is a top view diagram of the exemplary removable pulley system of FIG. 1, according to embodiments of the present invention.

FIGS. 3 and 4 are additional views of the removable pulley system 100. FIG. 3 is a side view diagram of the exemplary removable pulley system 100, and FIG. 4 is a top view diagram.

In other embodiments, the locking mechanism uses a spring-loaded, captive pin that provides enabled, disabled, locked, and unlocked positions (not shown). The locking mechanism may be configured for either automatic or manual operation. During manual locking operation, the cable technician translates the members of the locking mechanism to attach and detach the removable pulley system. During automatic operation, no intervention from the cable technician is required to attach the removable pulley system to the rack. However, intervention from the cable technician is required to detach the removable pulley system from the rack. The automatic operation of the removable pulley system employs an attachment mechanism (not shown) that includes pressurized clips that hook to the rack. The attachment mechanism includes two pressurized release clips to engage two opposite sides (faces) of the rack. The pressurized release clips automatically engage the overhead rack when the overhead rack is urged as an intermediate between the two pressurized release clips. The pressurized release clips adjust to the size of the rack and lock onto each side of the rack. Adjacent to the pressurized release clips are pressurization cartridges that allow automatic attachment to the rack. The pressurization cartridges are configured with release buttons that may be depressed by the cable technician to cause the pressurized release clips of the attachment mechanism to disengage from the rack.

In summary, embodiments of the present invention provide a removable pulley system that a cable technician may utilize to install cables in a overhead rack. The removable pulley system allows the cable technician to install varying lengths of different types of cables. The removable pulley system may be manually or automatically attached to the overhead rack and may be used with racks manufactured by various vendors. The removable pulley system may save time and reduce the cost associated with installing cables.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:
1. A removable pulley system attachable to a rack adapted to support data equipment, the removable pulley system comprising:
 a cable-run assembly comprising:
  (1) a plurality of cables of varying size, type, or service that are simultaneously retrieved from multiple spools within the cable-run assembly;
  (2) a holding wire adapted to secure the plurality of cables in the cable-run assembly, wherein the holding wire is permanently attached to a proximal end of an adjustable shaft that receives the multiple spools, wherein the adjustable shaft can be increased or decreased in length; and
 a locking mechanism having holes to receive a removable locking pin that secures the removable pulley system to the rack, wherein a segment of the rack secured by the removable locking pin is rigid and wherein a longest dimension of the segment runs parallel to the plurality of cables; and
 an arm that integrally attaches the cable-run assembly and the locking mechanism of the removable pulley system.

2. The removable pulley system of claim 1, wherein the segment secured by the locking pin is an intermediate between two parallel portions of the locking mechanism.

3. The removable pulley system of claim 1, wherein the removable locking pin includes a button that retracts balls that secure the removable pulley system to the rack.

4. The removable pulley system of claim 1, wherein the locking pin provides enabled, disabled, locked, and unlocked positions, and automatically attaches the removable pulley system to the rack.

5. The removable pulley system of claim 1, wherein the rack is an overhead rack.

6. The removable pulley system of claim 1, wherein the adjustable shaft is removable.

7. An apparatus for running cables along a rigid rack by employing a removable pulley system, the apparatus comprising:
 an attachment mechanism that secures the apparatus to the rigid rack, wherein the rigid rack is used as a shelf to support data equipment and wherein the attachment mechanism is perpendicular to the rigid rack;
 an adjustable shaft connected to the attachment mechanism for receiving spools for the cables, the adjustable shaft adapted to increase or decrease in length; and
 a U-shaped holding wire that secures the spools to the adjustable shaft, wherein the U-shaped holding wire is permanently attached to a joint at a proximal end of the adjustable shaft and the U-shaped holding wire is latched to a distal end of the adjustable shaft such that the U-shaped holding wire may be unlatched from the distal end of the adjustable shaft to remove one or more of the spools from the distal end of the adjustable shaft.

8. The apparatus of claim 7, further comprising the data equipment positioned on the rigid rack, wherein the attachment mechanism includes a locking system to engage with portions of the rigid rack.

9. The apparatus of claim 7, wherein the attachment mechanism includes a release system to disengage from the rigid rack.

10. The apparatus of claim 7, wherein, when mounted,
 the spools of cable are capable of rotational movement around the adjustable shaft to adjust the length of the cables that are run along the rack.

11. The apparatus of claim 7, wherein the rigid rack is an overhead rack.

12. An apparatus for locking a removable pulley system to a rack, the apparatus comprising:
 a cable-run assembly adapted to release or retract cable along the rack;
 a n-shaped member having holes and integrally attached to a common joint between the cable-run assembly and the n-shaped member;
 a locking pin that traverses the holes of the n-shaped member to secure the removable pulley system to the rack, wherein the locking pin automatically connects to a portion of the rack via retractable balls that prevent the locking pin from traversing out of the holes of the n-shaped member, and wherein a segment of the rack secured by the locking pin is rigid and has a longest dimension running parallel to the cable; and an adjustable shaft that can increase or decrease in length for receiving spools.

13. The apparatus of claim 12, wherein the locking pin is manually translated to disengage the releasable pulley system from the rack.

14. The apparatus of claim 12, wherein the rack is an overhead rack.

15. The removable pulley system of claim 1, wherein the removable locking pin comprises pressurized release clips that automatically secure the removable pulley system.

16. The removable pulley system of claim 15, wherein the pressurized release clips include calipers that automatically engage the rack.

17. The apparatus of claim 12, wherein the rack is a shelving system for data equipment that is located in a data center.

* * * * *